United States Patent Office 3,008,814
Patented Nov. 14, 1961

3,008,814
ANTIKNOCK MOTOR FUELS
Gordon B. Robbins, Claymont, Del., assignor to E. I. du Pont de Nemours and Company, Wilmington, Del., a corporation of Delaware
No Drawing. Filed July 8, 1959, Ser. No. 825,678
20 Claims. (Cl. 44—63)

This invention relates to antiknock motor fuels and more particularly to motor fuels for internal combustion engines equipped with fuel injection systems which motor fuels comprise hydrocarbons in the gasoline boiling range that contain lithium salts of certain substituted carboxylic acids as antiknock agents.

It is recognized that internal combustion engines knock under a wide variety of engine operating conditions, including varying speeds, degree of spark advance, compression ratio, fuel/air mixture ratio, temperatures, and intake manifold pressure. Because of these variations in engine conditions, the engine may knock under "mild" or "severe" stress. Industry recognizes that "mild" stress is usually encountered when the engine knocks under conditions of relatively low speed, retarded spark or low operating temperatures, such as are normally experienced in the operation of the existing type passenger car. On the other hand, "severe" stress is encountered under conditions of high engine speeds, advanced sparks, high operating temperatures or high manifold pressures, such as are encountered with high speed operation of automotive type engines or the normal operation of aviation engines.

The development of internal combustion engines of high compression ratios has established a need for high quality fuels having increased resistance to knock over the above-mentioned wide range of engine operating conditions. Careful refining and blending of fuel components can produce a fuel of sufficiently increased knock resistance to satisfy the engine requirements under the previously mentioned conditions, but such fuels are difficult and costly to produce. Usually, tetraethyllead is today employed in these fuel blends to provide the knock resistance which cannot easily and economically be obtained through refining techniques. Tetraethyllead is widely used since it does impart improved antiknock quality over the wide range of engine conditions mentioned above. The use of tetraethyllead, however, has limitations. Each successive increment of tetraethyllead produces only a fraction of the improvement in antiknock rating obtained with each previous increment.

Heretofore it has been proposed to employ in motor fuels for various purposes a variety of organometallic compounds, including some organic lithium compounds (other than those of the present invention). For example, Taveau in U.S. Patent 1,991,127 has proposed to employ lithium alkyls and lithium aryls in motor fuels of low antiknock value. However, such lithium compounds are quite unstable and tend to decompose in the presence of moisture, air or gases such as carbon dioxide, and furthermore have little or no appreciable antiknock effect when employed in engines of the character to which this invention relates. At an even earlier date, it was proposed to employ lithium oleate and lithium naphthenate an antiknock agents in straight-run gasolines having an octane number of a low order (about 50). However, lithium oleate has but little antiknock effect with the more modern motor fuels of high octane value, particularly in engines of the character to which this invention relates. Lithium naphthenate has but little antiknock effect in motor fuels of low octane value, including many of the present day motor fuels, and has a considerable antiknock effect only in highly branched aviation gasolines having a high initial octane number and in isooctane. Other organic metal compounds, including some lithium compounds, have been proposed for use as antipreignition compounds that require a deposit on the piston top and cylinder head in order to so function, and are not antiknock agents.

It is an object of the present invention to provide motor fuels containing new and improved antiknock compounds which are adapted for injection through the fuel injection systems of internal combustion engines which are equipped with fuel injection systems. Another object is to provide motor fuels of such character which function over the entire range of engine operating conditions. A further object is to provide new and improved antiknock compounds for fuels which contain tetraethyllead, which new antiknock compounds increase the knock resistance of the fuel to an extent which is not attainable by the use of tetraethyllead alone. A still further object is to provide novel antiknock compounds which are superior to tetraethyllead under severe operating conditions such as are normally encountered in aircraft or in high compression automotive engines. Other objects are to provide new compositions of matter and to advance the art. Still other objects will appear hereinafter.

The above and other objects may be accomplished in accordance with the present invention wherein there is provided a motor fuel for internal combustion engines equipped with fuel injection systems which fuel comprises hydrocarbons boiling in the gasoline boiling range containing, in an amount sufficient to provide from about 0.01 to about 2.0 grams of lithium metal per gallon of fuel, at least one lithium salt of an N-substituted aminoalkanecarboxylic acid of the formula LiOOC—Q—Z wherein Q is a saturated acyclic hydrocarbon radical of 1 to 6 carbon atoms and Z is a substituted amino group in which the substituents consist of 1 to 2 saturated hydrocarbon radicals of 1 to 24 carbon atoms. A particular feature of this invention involves the provision of motor fuels of the above character which, in addition to the lithium compounds, contain tetraethyllead.

It has been found that the lithium compounds of this invention are very effective to increase the antiknock properties of motor fuels of varying types in the absence and in the presence of tetraethyllead. They are effective over the entire range of engine operating conditions. In the presence of tetraethyllead they increase the antiknock properties of the fuel to a much greater extent than can be obtained by corresponding increases in the amount of tetraethyllead.

The fuels of the present invention are applicable for use in engines equipped with fuel injection systems. With ordinary carburetion, many of the lithium antiknock compounds of this invention are not sufficiently inductable without an assistant to avoid deposition in the intake system over an extended period of operation and fail to vaporize sufficiently to exert the desired antiknock effect. The lithium salts of this invention are soluble in the fuels. While they are normally injected with the fuel itself, they may be injected separately as a dust or powder, or with solvents used either to carry them alone or in the supplementary antiknock solutions such as the water/alcohol mixtures employed in aircraft engines or tetraethyllead/alcohol mixtures employed in automotive engines. These compounds are effective irrespective of which of the above methods is used to introduce them into the cylinder of the engine.

The present invention is particularly applicable to hydrocarbon fuels for internal combustion engines and more particularly to fuels which may be a mixture of hydrocarbons boiling in the gasoline range, or a refined gasoline as defined in the ASTM D–288–53 (adopted 1939, revised 1953). Such fuels may be clear fuels or fuels containing organo-lead antiknock compounds such as tetraethyllead. Such organo-lead compounds may be used in amounts up to the equivalent of 6 ml. of tetraethyllead per gallon of fuel. When used, the organo-lead compound usually will be tetraethyllead and usually will be present in an amount of from about 1.5 to about 3 ml. per gallon of fuel. Also, the fuels may be finished fuels which contain varying amounts of conventional fuel additives such as scavenging agents, dyes, antioxidants, anti-icing agents, rust inhibitors, corrosion inhibitors, inhibitors of haze formation, inhibitors of gum formation, anti-preignition agents, and the like.

The lithium compounds which are employed in accordance with this invention are the lithium salts having the formula LiOOC—Q—Z wherein Q is a saturated acyclic hydrocarbon radical of 1 to 6 carbon atoms, preferably 1 to 3 carbon atoms, which may be straight-chain or branched-chain and Z is a substituted amino group in which the substituents consist of 1 to 2 saturated hydrocarbon radicals of 1 to 24 carbon atoms which may be straight-chain or branched-chain acyclic radicals, alicyclic radicals, or hydrocarbon chains in which the terminal carbon atoms are bonded to the nitrogen atom to form a heterocyclic ring, and wherein both the alicyclic and the heterocyclic rings may contain alkyl side chains. It will be understood that an acyclic radical is an open-chain radical; and an alicyclic radical means a saturated cyclic hydrocarbon radical. A preferred class of compounds consists of the lithium salts of the mono-(dialkylamino)-alkanemonocarboxylic acids of the formula

LiOOC—Q—NRR' wherein each of R and R' is an alkyl radical of 1 to 24 carbon atoms, preferably 1 to 4 carbon atoms. Another desirable class consists of the monoalkyl substituted amino compounds which have the formula

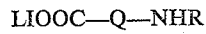

LiOOC—Q—NHR wherein R is an alkyl radical of 1 to 24 carbon atoms, preferably 1 to 8 carbon atoms. Also, those compounds of the formula LiOOC—Q—Z wherein Z represents the heterocyclic piperidino group are very effective and constitute another preferred class. Particularly preferred compounds are the salts of the substituted aminopropionic and aminobutyric acids (Q has 2 to 3 carbon atoms). In all cases, it is preferred that the substituted amino (—Z) group be attached to a carbon atom which is in one of the positions 2 or 3 of the alkanecarboxylic acid nucleus, such compounds being the more effective compounds.

Representative lithium salts of this invention are lithium 3-dimethylamino-2-methylpropionate, lithium 2-(dibutylamino)propionate, lithium 3-(dibutylamino)propionate, lithium 3-dibutylamino-2-methylpropionate, lithium 3-tert.-butylamino-2-methylpropionate, lithium 2-(diethylamino)propionate, lithium 2-methyl-3-(methylamino)propionate, lithium 3-(dodecylamino)propionate, lithium 2-methyl - 3 - (1,1,3,3 - tetramethylbutylamino)propionate, lithium 3-[tert.-alkyl($C_{12}$-$C_{15}$)amino]propionate, lithium 3-[tert.-alkyl($C_{18}$-$C_{24}$)amino]propionate, lithium dibutyl-aminoacetate, lithium 2-methyl-3-piperidinopropionate, lithium 3-piperidinopropionate, lithium 3-(methylamino)-propionate, lithium 2-methyl-4-(dimethylamino)butyrate, lithium 4-(diethylamino)butyrate, lithium 3-(isopropylamino)propionate, lithium 3-(di-sec.-butylamino)propionate, lithium 3-(cyclohexylamino)propionate, lithium 3 - (octadecylamino)propionate. Lithium 3 - (dibutylamino)propionate is preferred.

Lithium 3-[tert.-alkyl($C_{12}$-$C_{15}$)amino]propionate is a mixture of the lithium salts of the mixture of alkyl-aminopropionic acids derived in known manner from a commercial mixture of high molecular weight tertiary-alkyl primary amines in which the alkyl groups are principally those containing highly branched chains in the range of 11 to 14 carbon atoms and in which the primary amino nitrogen is directly attached to a tertiary carbon atom. Similarly, lithium 3-[tert.-alkyl($C_{18}$-$C_{24}$)amino]-propionate is the mixture of lithium salts of the mixture of alkylaminopropionic acids derived from a commercial mixture of tertiary-alkyl primary amines in which the alkyl groups are principally those containing highly branched chains in the range of 18 to 22 carbon atoms.

The lithium salts of this invention are readily prepared by the reaction of the appropriate acid with a lithium base, preferably lithium hydroxide monohydrate. Lithium metal, lithium hydride, lithium alkoxide or lithium carbonate may also be used to advantage to form the lithium salt. The salts are readily obtained by neutralizing the acid with a stoichiometric quantity of the lithium base followed by recovery of the salt from the solution. For ease of isolation in pure form, the salt is best prepared in an inert organic solvent, such as benzene, toluene, ether and dioxane. In general, the carboxylic acids and their anhydrides, and the methods of preparing them are known to those skilled in the art.

The amount of the lithium compound usually employed will vary with the quality and intended use of the fuel. Normally, the amount employed will depend upon the molecular weight of the compound, but should be such as to give 0.01 gram to about 2.0 grams of lithium metal per gallon of the fuel, regardless of the presence, or the amount of tetraethyllead in the fuel. Single members of the class of lithium salts of this invention or mixtures of any two or more members thereof may be used as desired.

The lithium antiknock compounds of this invention, in general, are enough soluble in the fuels to provide the desired concentration of the lithium salt without the use of an alcohol solubilizing assistant. Some are insufficiently soluble to provide the higher concentrations. In such cases, blending agents may be employed to enhance their solubility in the fuel. Also, blending agents are sometimes desirable with the more soluble compounds. Typical blending agents are gasoline miscible glycols, esters, ketones, amides, alcohols, and other polar organic liquids. Methanol, ethanol and isopropanol are particularly suitable blending agents. The lithium compounds may be dissolved directly in the blended motor fuel or added as a concentrated solution in the blending agent.

In the examples given hereinafter, three knock test methods were employed; the first two being representative of automotive operating conditions are referred to as the "mild" test and the "severe" test, while the third test is representative of supercharged aviation conditions. In he "mild" and "severe" tests, the fuel samples were tested in a Waukesha ASTM D–909–49T Knock Test Method single cylinder knock rating engine equipped with a four-hole, overhead valve, variable compression ratio head. The engine is mounted on a test stand with a suitable motor-generator unit which absorbs the power output of the engine. A spark plug, mounted in the conventional position for this type engine, a rate of change of pressure pick-up and a steel plug occupy three of the four holes in the head. A Waukesha ASTM D–909–49T Knock Test Method fuel injector is inserted into the fourth hole in the head by means of an adapter, and is supplied with fuel from the fuel injection pump. This fuel system injects the fuel directly into the combustion chamber. With the engine operating, the occurrence of knock is determined at the trace knock intensity level by means of the rate of change of pressure pick-up mounted in the cylinder head. The signal from the pick-up feeds into a cathode-ray oscilloscope, and the occurrence of knock is observed as a shattering of the rate of change of pressure trace on the oscilloscope screen late in the engine cycle.

The engine is operated under the following conditions:

| | Test Conditions | |
|---|---|---|
| | Mild | Severe |
| Speed, r.p.m. | 600 | 1200 |
| Spark advance (degree before top center) | 13 | 30 |
| Fuel injection timing (degree after top center on intake stroke) | 50 | 50 |
| Fuel/Air ratio | 0.0800±0.0005 | 0.0700±0.0005 |
| Intake manifold air pressure, (in. Hg abs.) | 30 | 30 |
| Coolant temperature, °F | 212 | 212 |
| Intake air temperature, °F | 200 | 200 |
| Oil temperature, °F | 160 | 160 |
| Compression ratio | Varied to produce trace knock | |

These tests and the test conditions were developed to evaluate antiknock compounds under the same stresses as would be encountered in automotive operation.

Under these operating conditions, the knock resistance of all fuels tested is determined by comparing the highest usable knock-free compression ratio of these fuels to that of primary reference fuels consisting of blends of isooctane and n-heptane below 100 performance number, and isooctane plus tetraethyllead above 100 performance number. The knock resistance of all fuels tested is expressed in terms of Army-Navy Performance Numbers as defined in Tables VII and VIII in the ASTM Aviation Method (D614–49T), as recorded in the ASTM Manual of Engine Test Methods for Rating Fuels, published by the American Society for Testing Materials, October 1952.

The supercharged aviation tests were carried out in an engine equipped with manifold fuel injection in accordance with the procedure set forth in ASTM D–909–49T.

The following examples are given to more clearly illustrate this invention, preferred modes of carrying it into effect and the advantageous results obtained thereby wherein the percentages employed are by volume except where specifically indicated otherwise.

Example 1

To portions of a hydrocarbon fuel blend comprising by volume 30% olefinic hydrocarbons, 34% saturated hydrocarbons, and 36% aromatic hydrocarbons, simulating a gasoline stock, and containing 3 ml. of tetraethyllead per gallon, was added a number of lithium salts of N-substituted aminoalkanecarboxylic acids. Under the mild test conditions, the performance number of the leaded fuel was increased by each of the added lithium salts as shown in the following table.

| Lithium Salt | Lithium Concn., g./gal. fuel | Ethanol added, Volume Percent | Units Increase in Performance Number |
|---|---|---|---|
| (a) Lithium 3-dimethylamino-2-methylpropionate | 0.285 | 0 | 12 |
| (b) Lithium 2-(dibutylamino)propionate | 0.25 | 0 | 13 |
| (c) Lithium 3-(dibutylamino)propionate | 0.25 | 2 | 8 |
| (d) Lithium 3-dibutylamino-2-methylpropionate | 0.25 | 4 | 7 |
| (e) Lithium 3-tert.-butylamino-2-methylpropionate | 0.25 | 2 | 11 |
| (f) Lithium 2-(diethylamino)propionate | 0.25 | 2 | 8 |
| (g) Lithium 2-methyl-3-(methylamino)propionate | 0.21 | 10 | 6 |
| (h) Lithium 3-(dodecylamino)propionate | 0.25 | 2 | 3 |
| (i) Lithium 2-methyl-3-(1,1,3,3-tetramethylbutylamino)propionate | 0.25 | 0 | 10 |
| (j) Lithium 3-[tert.-alkyl($C_{12}$—$C_{15}$)amino]propionate | 0.25 | 0 | 6 |
| (k) Lithium 3-[tert.-alkyl($C_{18}$—$C_{24}$)amino]propionate | 0.25 | 0 | 5 |
| (l) Lithium dibutylaminoacetate | 0.25 | 5 | 7 |
| (m) Lithium 2-methyl-3-piperidinopropionate | 0.25 | 4 | 12 |
| (n) Lithium 3-piperidinopropionate | 0.25 | 5 | 8 |

In most cases, the ethanol was not necessary to provide the desired solubility but was employed as a matter of convenience.

When methyl lithium and tert.-butyl lithium were tested under mild test conditions, they showed no antiknock activity. When phenyl lithium was tested under the severe test employing amounts sufficient to provide from 1.06 to 3.18 grams of lithium per gallon of fuel, it increased the performance number of the fuel by only 0.9 to 1.8 units. Lithium oleate, in the above fuel under mild conditions employing 0.25 gram of lithium per gallon of fuel and 5% methanol, but no added tetraethyllead, showed an increase in the performance number of 1.3; and, in the presence of 3 ml. of tetraethyllead per gallon of fuel, showed an increase in performance number of 0 to 5.0. Lithium naphthenate, in the above fuel, had little effect as an antiknock agent, raising the performance number only 2 units with and without added tetraethyllead, employing 0.25 gram of lithium per gallon of fuel and 5% isopropanol as a solubilizing agent.

Example 2

To portions of isooctane as a base fuel were added the lithium salts listed below. The treated fuel with and without added tetraethyllead and isopropanol as a solubilizing agent was then tested for its antiknock rating under the severe supercharged aviation conditions as described in ASTM D–909–49T. The increase in the formance number of the fuel provided by the added lithium salt, together with the composition of the fuel, is shown in the following table.

Compound:
    A  Lithium 3-[tert.-alkyl($C_{12}$=$C_{15}$)amino]propionate
    B  Lithium 3-[tert.-alkyl($C_{18}$=$C_{24}$)amino]propionate
    C  Lithium 3-dibutylaminopropionate

| Compound | Lithium Concn., g./gal. fuel | TEL,[1] ml./gal. fuel | Isopropanol, Volume Percent | Units Increase in Performance Number |
|---|---|---|---|---|
| (a) A | 0.12 | 0 | 0 | 20 |
| (b) A | 0.12 | 1.5 | 0 | 22 |
| (c) B | 0.12 | 0 | 0 | 22 |
| (d) B | 0.12 | 1.5 | 0 | 14 |
| (e) C | 0.12 | 0 | 0 | 45 |
| (f) C | 0.12 | 1.5 | 0 | 28 |

[1] Tetraethyllead.

Lithium oleate, in a proportion to provide 0.25 gram of lithium per gallon of isooctane with 10% ethanol as a solubilizing agent but without added tetraethyllead and tested under the above conditions, increased the performance number only 3.7 units.

It will be understood that the preceding examples have been given for illustrative purposes solely and that this invention is not restricted to the specific embodiments described therein. On the other hand, it will be apparent to those skilled in the art that, subject to the limitations set forth in the general description, the materials, proportions, conditions and techniques employed may be widely varied without departing from the spirit or scope of this invention.

From the preceding description, it will be apparent that this invention provides motor fuels for use in internal combustion engines equipped with fuel injection systems which contain new and improved antiknock compounds that function over the entire range of engine operating conditions and very materially increase the antiknock properties of the fuels. Under severe operating conditions and in the presence of tetraethyllead the new antiknock agents are superior to tetraethyllead. Therefore, it is believed that this invention constitutes a valuable advance in and contribution to the art.

The embodiments of the invention in which an exclusive property or privilege is claimed are defined as follows:

1. A motor fuel for internal combustion engines equipped with fuel injection systems which consists essentially of hydrocarbons in the gasoline boiling range containing, in an amount sufficient to provide from about 0.01 to about 2.0 grams of lithium metal per gallon of fuel, at least one lithium salt of an N-substituted aminoalkanecarboxylic acid of the formula

LiOOC—Q—Z wherein Q is a saturated acyclic hydrocarbon radical of 1 to 6 carbon atoms and Z is a substituted amino group in which the substituents consist of 1 to 2 saturated hydocarbon radicals of 1 to 24 carbon atoms.

2. A motor fuel for internal combustion engines equipped with fuel injection systems which consists essentially of hydrocarbons in the gasoline boiling range containing, in an amount sufficient to provide from about 0.01 to about 2.0 grams of lithium metal per gallon of fuel, at least one lithium salt of an N-substituted aminoalkanecarboxylic acid of the formula

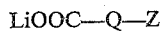
LiOOC—Q—Z wherein Q is a saturated acyclic hydrocarbon radial of 1 to 6 carbon atoms and Z is a substituted amino group in which the substituents consist of 1 to 2 saturated hydrocarbon radicals of 1 to 24 carbon atoms and in which the nitrogen atom is bonded to a carbon atom in one of the positions 2 to 3 of the alkanecarboxylic acid nucleus.

3. A motor fuel for internal combustion engines equipped with fuel injection systems which consists essentially of hydrocarbons in the gasoline boiling range containing, in an amount sufficient to provide from about 0.01 to about 2.0 grams of lithium metal per gallon of fuel, at least one lithium salt of an N-substituted aminoalkanecarboxylic acid of the formula

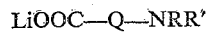
LiOOC—Q—NRR' wherein Q is a saturated acyclic hydrocarbon radial of 1 to 6 carbon atoms and each of R and R' is an alkyl radical of 1 to 24 carbon atoms.

4. A motor fuel for internal combustion engines equipped with fuel injection systems which consists essentially of hydrocarbons in the gasoline boiling range containing, in an amount sufficient to provide from about 0.01 to about 2.0 grams of lithium metal per gallon of fuel, at least one lithium salt of an N-substituted aminoalkanecarboxylic acid of the formula

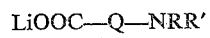
LiOOC—Q—NRR' wherein Q is a saturated acyclic hydrocarbon radical of 1 to 3 carbon atoms and each of R and R' is an alkyl radical of 1 to 4 carbon atoms and in which the nitrogen atom is bonded to a carbon atom in one of the positions 2 to 3 of the alkanecarboxylic acid nucleus.

5. A motor fuel for internal combustion engines equipped with fuel injection systems which consists essentially of hydrocarbons in the gasoline boiling range containing, in an amount sufficient to provide from about 0.01 to about 2.0 grams of lithium metal per gallon of fuel, at least one lithium salt of an N-substituted aminoalkanecarboxylic acid of the formula

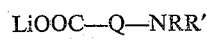
LiOOC—Q—NRR' wherein Q is a saturated acyclic hydrocarbon radical of 2 carbon atoms and each of R and R' is an alkyl radical of 1 to 4 carbon atoms and in which the nitrogen atom is bonded to a carbon atom in one of the positions 2 to 3 of the alkanecarboxylic acid nucleus.

6. A motor fuel for internal combustion engines equipped with fuel injection systems which consists essentially of hydrocarbons in the gasoline boiling range which contain, in an amount sufficient to provide from about 0.01 to about 2.0 grams of lithium metal per gallon of fuel, lithium 3-dibutylaminopropionate.

7. A motor fuel for internal combustion engines equipped with fuel injection systems which consists essentially of hydrocarbons in the gasoline boiling range containing, in an amount sufficient to provide from about 0.01 to about 2.0 grams of lithium metal per gallon of fuel, at least one lithium salt of an N-substituted aminoalkanecarboxylic acid of the formula

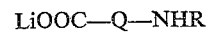
LiOOC—Q—NHR wherein R is an alkyl radical of 1 to 24 carbon atoms and Q is a saturated acyclic hydrocarbon radical of 1 to 6 carbon atoms.

8. A motor fuel for internal combustion engines equipped with fuel injection systems which consists essentially of hydrocarbons in the gasoline boiling range which contain, in an amount sufficient to provide from about 0.01 to about 2.0 grams of lithium metal per gallon of fuel lithium 3-tert.-butylamino-2-methylpropionate.

9. A motor fuel for internal combustion engines equipped with fuel injection systems which consists essentially of hydrocarbons in the gasoline boiling range containing, in an amount sufficient to provide from about 0.01 to about 2.0 grams of lithium metal per gallon of fuel, at least one lithium salt of an N-substituted aminoalkanecarboxylic acid of the formula

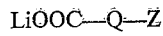
LiOOC—Q—Z wherein Q is a saturated acyclic hydrocarbon radical of 1 to 6 carbon atoms and Z is a piperidino radical.

10. A motor fuel for internal combustion engines equipped with fuel injection systems which consists essentially of hydrocarbons in the gasoline boiling range which contain, in an amount sufficient to provide from about 0.01 to about 2.0 grams of lithium metal per gallon of fuel, lithium 2-methyl-3-piperidinopropionate.

11. A motor fuel for internal combustion engines equipped with fuel injection systems which consists essentially of hydrocarbons in the gasoline boiling range containing from about 1.5 to about 6 ml. of tetraethyllead per gallon of fuel and, in an amount sufficient to provide from about 0.01 to about 2.0 grams of lithium metal per gallon of fuel, at least one lithium salt of an N-substituted aminoalkanecarboxylic acid of the formula

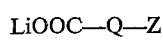
LiOOC—Q—Z wherein Q is a saturated acyclic hydrocarbon radical of 1 to 6 carbon atoms and Z is a substituted amino group in which the substituents consist of 1 to 2 saturated hydrocarbon radicals of 1 to 24 carbon atoms.

12. A motor fuel for internal combustion engines equipped with fuel injection systems which consists essentially of hydrocarbons in the gasoline boiling range containing from about 1.5 to about 6 ml. of tetraethyllead per gallon of fuel and, in an amount sufficient to provide from about 0.01 to about 2.0 grams of lithium metal per gallon of fuel, at least one lithium salt of an N-substituted aminoalkanecarboxylic acid of the formula

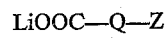
LiOOC—Q—Z wherein Q is a saturated acyclic hydrocarbon radical of 1 to 6 carbon atoms and Z is a subtsituted amino group in which the substituents consist of 1 to 2 saturated hydrocarbon radicals of 1 to 24 carbon atoms and in which the nitrogen atom is bonded to a carbon atom in one of the positions 2 to 3 of the alkanecarboxylic acid nucleus.

13. A motor fuel for internal combustion engines equipped with fuel injection systems which consists essentially of hydrocarbons in the gasoline boiling range which contain from about 1.5 to about 6 ml. of tetraethyllead per gallon of fuel and, in an amount sufficient to provide from about 0.01 to about 2.0 grams of lithium metal per gallon of fuel, at least one lithium salt of an N-substituted aminoalkanecarboxylic acid of the formula LiOOC—Q—NRR′ wherein Q is a saturated acyclic hydrocarbon radical of 1 to 6 carbon atoms and each of R and R′ is an alkyl radical of 1 to 24 carbon atoms and the —NRR′ group is attached to a carbon in one of the positions 2 to 3 of the alkanecarboxylic acid nucleus.

14. A motor fuel for internal combustion engines equipped with fuel injection systems which consists essentially of hydrocarbons in the gasoline boiling range which contain from about 1.5 to about 6 ml. of tetraethyllead per gallon of fuel and, in an amount sufficient to provide from about 0.01 to about 2.0 grams of lithium metal per gallon of fuel, at least one lithium salt of an N-substituted aminoalkanecarboxylic acid of the formula LiOOC—Q—NRR′ wherein Q is a saturated acyclic hydrocarbon radical of 1 to 3 carbon atoms and each of R and R′ is an alkyl radical of 1 to 4 carbon atoms and the —NRR′ group is attached to a carbon in one of the positions 2 to 3 of the alkanecarboxylic acid nucleus.

15. A motor fuel for internal combustion engines equipped with fuel injection systems which consists essentially of hydrocarbons in the gasoline boiling range which contain from about 1.5 to about 6 ml. of tetraethyllead per gallon of fuel and, in an amount sufficient to provide from about 0.01 to about 2.0 grams of lithium metal per gallon of fuel, at least one lithium salt of a dialkylaminopropionic acid in which each alkyl group contains 1 to 4 carbon atoms.

16. A motor fuel for internal combustion engines equipped with fuel injection systems which consists essentially of hydrocarbons in the gasoline boiling range which contain from about 1.5 to about 6 ml. of tetraethyllead per gallon of fuel and, in an amount sufficient to provide from about 0.01 to about 2.0 grams of lithium metal per gallon of fuel, lithium 3-dibutylaminopropionate.

17. A motor fuel for internal combustion engines equipped with fuel injection systems which consists essentially of hydrocarbons in the gasoline boiling range which contain from about 1.5 to about 6 ml. of tetraethyllead per gallon of fuel and, in an amount sufficient to provide from about 0.01 to about 2.0 grams of lithium metal per gallon of fuel, at least one lithium salt of an N-substituted aminoalkanecarboxylic acid of the formula LiOOC—Q—NHR wherein Q is a saturated acyclic hydrocarbon radical of 1 to 6 carbon atoms and R is an alkyl radical of 1 to 24 carbon atoms and the —NHR group is attached to a carbon in one of the positions 2 to 3 of the alkanecarboxylic acid nucleus.

18. A motor fuel for internal combustion engines equipped with fuel injection systems which consists essentially of hydrocarbons in the gasoline boiling range which contain from about 1.5 to about 6 ml. of tetraethyllead per gallon of fuel and, in an amount sufficient to provide from about 0.01 to about 2.0 grams of lithium metal per gallon of fuel, lithium 3-tert.-butylamino-2-methylpropionate.

19. A motor fuel for internal combustion engines equipped with fuel injection systems which consists essentially of hydrocarbons in the gasoline boiling range which contain from about 1.5 to about 6 ml. of tetraethyllead per gallon of fuel and, in an amount sufficient to provide from about 0.01 to about 2.0 grams of lithium metal per gallon of fuel, at least one lithium salt of an N-substituted aminoalkanecarboxylic acid of the formula LiOOC—Q—Z wherein Q is a saturated acyclic hydrocarbon radical of 1 to 6 carbon atoms and Z is a piperidino radical.

20. A motor fuel for internal combustion engines equipped with fuel injection systems which consists essentially of hydrocarbons in the gasoline boiling range which contain from about 1.5 to about 6 ml. of tetraethyllead per gallon of fuel and, in an amount sufficient to provide from about 0.01 to about 2.0 grams of lithium metal per gallon of fuel, lithium 2-piperidinopropionate.

References Cited in the file of this patent

UNITED STATES PATENTS

| | | |
|---|---|---|
| 2,460,700 | Lyons | Feb. 1, 1949 |
| 2,548,630 | Sorg et al. | Apr. 10, 1951 |
| 2,728,648 | Hirschler et al. | Dec. 27, 1955 |

FOREIGN PATENTS

| | | |
|---|---|---|
| 582,718 | Germany | Aug. 21, 1933 |
| 300,156 | Great Britain | Nov. 6, 1928 |
| 795,658 | Great Britain | May 28, 1958 |